(12) United States Patent
Thanner et al.

(10) Patent No.: US 7,897,290 B2
(45) Date of Patent: Mar. 1, 2011

(54) DEVICE AND METHOD FOR DETERMINING THE OPERATING PARAMETERS OF INDIVIUDAL CELLS OR SHORT STACKS OF FUEL CELLS

(75) Inventors: Herbert Thanner, Graz (AT); Martin Schüssler, Graz (AT)

(73) Assignee: AVL List GmbH, Graz (AT)

( * ) Notice: Subject to any disclaimer, the term of this patent is extended or adjusted under 35 U.S.C. 154(b) by 1205 days.

(21) Appl. No.: 10/588,790

(22) PCT Filed: Feb. 10, 2005

(86) PCT No.: PCT/AT2005/000041
§ 371 (c)(1),
(2), (4) Date: Aug. 9, 2006

(87) PCT Pub. No.: WO2005/078841
PCT Pub. Date: Aug. 25, 2005

(65) Prior Publication Data
US 2007/0134521 A1 Jun. 14, 2007

(30) Foreign Application Priority Data

Feb. 12, 2004 (AT) .................................. A 216/2004
Feb. 19, 2004 (AT) .................................. A 268/2004
May 13, 2004 (AT) .................................. A 832/2004

(51) Int. Cl.
*H01M 8/10* (2006.01)
*H01M 8/14* (2006.01)
*H01M 8/24* (2006.01)
*H01M 2/20* (2006.01)

(52) U.S. Cl. ......... 429/470; 429/452; 429/464; 429/465; 429/469

(58) Field of Classification Search ............... 429/12–46
See application file for complete search history.

(56) References Cited

U.S. PATENT DOCUMENTS

| | | | | |
|---|---|---|---|---|
| 5,208,114 | A | * | 5/1993 | Uematsu et al. ............... 429/20 |
| 5,942,344 | A | * | 8/1999 | Lehmeier et al. ............... 429/13 |
| 6,410,177 | B1 | * | 6/2002 | Iyasu et al. ..................... 429/26 |
| 2003/0180590 | A1 | * | 9/2003 | Hase et al. ...................... 429/26 |
| 2004/0146772 | A1 | * | 7/2004 | Miyao et al. ................... 429/38 |
| 2005/0221149 | A1 | | 10/2005 | Matsubayashi et al. |

FOREIGN PATENT DOCUMENTS

| | | | |
|---|---|---|---|
| DE | 19913795 | | 10/2000 |
| EP | 1271684 | * | 5/2002 |
| EP | 1271684 | | 1/2003 |
| JP | 58093173 | | 6/1983 |
| JP | 2000-340249 | * | 12/2000 |
| JP | 2002298898 | | 10/2002 |
| WO | 03028141 | | 4/2003 |
| WO | 2004077587 | | 9/2004 |

OTHER PUBLICATIONS

Abstract of JP 2002 298898.
English Abstract of WO 2004/077587.
English Abstract of JP 58093173.

* cited by examiner

*Primary Examiner* — Dah-Wei D Yuan
*Assistant Examiner* — Steven Scully
(74) *Attorney, Agent, or Firm* — Dykema Gossett PLLC (57) ABSTRACT

The invention relates to a device and a method for determining the operating parameters of individual cells (2) or short stacks (10) of fuel cells, preferably of medium-temperature or high-temperature fuel cells.

9 Claims, 7 Drawing Sheets

DEVICE AND METHOD FOR DETERMINING THE OPERATING PARAMETERS OF INDIVIUDAL CELLS OR SHORT STACKS OF FUEL CELLS

BACKGROUND OF THE INVENTION

1. Field of the Invention

The invention relates to a device and a method for determining the operating parameters of individual fuel cells or short stacks of fuel cells, preferably medium-temperature or high-temperature fuel cells. Thus, for instance, the operating parameters of solid oxide fuel cells (SOFC) or of molten carbonate fuel cells (MCFC) may be determined.

The invention also relates to a device and method for cooling hot process gases which arise during the operation of fuel cells or during the testing of components of fuel cells systems, such as reformers, mixing or conditioning systems or catalysers, at a fuel cell testing station.

The invention furthermore relates to a fuel cell stack made up of medium- or high-temperature fuel cells, which are provided with clamping elements acting on both ends of the fuel cell stack in order to compensate the internal operational pressure and/or seal the individual fuel cells.

2. The Prior Art

Devices and methods for the determination of individual cells or short stacks of cells serve to characterize or test fuel cells, for instance as regards their dependence on the temperature distribution over the cell surface.

The operational characteristics of individual cells and short stacks of, for instance, solid oxide fuel cells (SOFC) must be measured in the development process as well as in quality control. Up to now such tests and quality control measurements have usually been performed in a furnace kept at temperatures in the range from 300° C. to 1000° C., in order to guarantee a high and uniform ambient temperature.

Temperature distribution over the plane of the cell surface is influenced by various factors. In SOFCs there is primarily the orientation of flow from anode to cathode (cross-, co-, or counter-flow), the internal rate of the reforming reaction at the anode, and the flow volume and entry temperature of the cooling air. Besides, the design of the fields of flow will influence the temperature distribution.

The problems to be solved may be described as follows:

The data obtained in tests on the individual cell should permit direct inference of the characteristics of the whole stack of fuel cells. A furnace can simulate the unequal temperature distributions over the cell surface, as they occur in the stack before and behind the tested cell, only by a constant temperature.

A specific setting of temperature distributions in order to study the influence of different temperature distributions on the cell characteristics (electrical power output, service life, etc.) for example, is not possible.

Due to the low efficiency of heat transfer in the furnace between the heated furnace air and the fuel cell stack or the individual cells, heating performance is limited. Thus only slow heating-up is possible.

The gradients which arise when a SOFC consisting of many individual cells is heated, cannot be simulated realistically, i.e. impressed on the individual cell.

Parameters for simulation models have to be derived from experimental operating data which have been measured at an inhomogeneous temperature distribution not conducive to accurate measuring.

It is an object of the present invention to propose improvements on devices and methods for measuring the operating parameters of individual cells or short stacks of medium- or high-temperature fuel cells as described above, such that the temperature situation prevailing in a fuel cell stack may be better simulated for development or quality control purposes.

In fuel cell testing stations (FCTS) the process gases have to be conditioned as regards thermodynamic characteristics (pressure, temperature, flow volume) and also concerning the composition of the gases. This may for instance be done with the help of a gas mixing station (=a combination of mass flow controllers) and electrical heaters or heat exchangers. The gas streams for anode and cathode are preheated up to temperatures of 800° C. before being fed to the fuel cell components (e.g. reformer or stack). Depending on the chemical or electrochemical reaction in the fuel cell components the temperature of the gas exiting the components may be higher or lower. In most cases, however, an additional cooling device for the process gases will be required before they can be passed to the exhaust hood of the testing station (danger of explosion!). In addition, the process gases in the exhaust vent must be suitably diluted to significantly below the explosion threshold.

Fuel cell stacks are usually subjected to an electrical load by means of an electronic device. The heat generated thereby must also be carried off. Air- or water-cooled devices for this purpose are marketed.

Finally, the chemical and electrochemical reactions in a fuel cell stack will generate heat, which also has to be carried off from this component by means of a cooling device.

Fuel cell testing stations thus require a connection to an external supply of cooling water. An external cooling water loop will significantly increase the cost of laboratory infrastructure, however.

From DE 199 13 795 C1 there is known a device with an internal combustion engine and a fuel cell system, in which the fuel cell assembly supplies electrical energy to the electrical units of the vehicle. By using some components, such as cooler, exhaust gas system and air filter, jointly for both the internal combustion engine and the fuel cell system, a reduction of the operating expense is achieved. Furthermore, the fuel cell system can be heated up by the exhaust gases generated by the internal combustion engine.

A further object of the invention will be to improve a device or a method for cooling hot process gases, which arise during the operation of fuel cells or the testing of components of fuel cell systems, such as reformers, mixing or conditioning systems or catalysers, in a testing station for fuel cells, in such a way that an external cooling water supply can be dispensed with.

In order to compensate the internal operating pressure and/or to seal the individual cells and/or to assure good electrical contact between intermediary plates/bipolar plates and electrodes, forces have to be exerted on the fuel cell stack. In known fuel cell designs these forces are applied via the fuel cell housing or via separate tensioning or clamping mechanisms.

At temperatures above 300° C. the material strength of these clamping mechanisms is significantly reduced, thus requiring relatively large masses to supply the mechanical forces. At temperatures above 600° C., which occur in the case of solid oxide fuel cells (SOFC) or molten carbonate fuel cells (MCFC), special metallic materials are required, leading to increased costs.

Thermal expansion of the fuel cell during start-up must be allowed for in the clamping mechanism by providing compensating elements adjacent to the fuel cell. In operation this will result in an inhomogeneous temperature distribution, since the clamping mechanism and the compensating elements act as cooling surfaces.

In conventional fuel cell stacks the heat capacity of the clamping mechanism will delay start-up and cause an inhomogeneous temperature distribution during start-up. In the case of frequent cold-starts heating up the additional masses will significantly increase fuel consumption.

In WO 03/028141 A2, for instance, a solid oxide fuel cell is described, which comprises a stack of individual cells clamped together by a clamping mechanism consisting of a base plate and a clamping plate. Between the clamping plate and the fuel cell stack there is placed a corrugated bellows made up of a number of bellows elements, which compensates the thermal expansion of the fuel cells during start-up. The corrugated bellows is made from heat-resistant metal alloy and is filled with a gas, for instance air at atmospheric pressure or an inert gas at higher pressure. Disadvantageously, during operation of the fuel cell an inhomogeneous temperature distribution will result since the base plate of the clamping mechanism and the metallic corrugated bellows will drain heat from the adjacent fuel cells and have differing thermal conductivities. A further disadvantage lies in the fact that start-up of the fuel cell or reaching of the optimum operating temperature is delayed due to the heat capacity of the clamping mechanism.

It is a third object of the invention to propose improvements for a fuel cell stack with a clamping mechanism as described, which will provide a more homogeneous temperature distribution in the start-up phase and permit the use of lighter, less expensive materials for the clamping mechanism.

SUMMARY OF THE INVENTION

The first object is achieved by the invention by providing that planar heating elements are pressed against one or preferably both exterior faces of the individual cell or the short stack, in parallel with the plane of the fuel cell, and that via these heating elements a given temperature $T_H$ may be set for the fuel cell and that at least one operational parameter of the fuel cell is measured as a function of the temperature selected. Parameters such as the temperature, current and voltage values, the composition of the process gases, the pressure of the process gases, but also the useful life of the fuel cell or individual components of the cell may be determined as a function of the temperature $T_H$ or of its variation over time.

The problems cited above are thus solved by heating plates, which are positioned directly or with an intermediary layer against the individual fuel cell, with the heating plates pressed against the cell surface in order to apply the clamping force necessary for operation of the cell. In this way the temperature curve over time or a temperature gradient can be set and thus different operational states of the fuel cell such as start-up, load change or continuous operation may be simulated.

In a further development of the invention a two-dimensional temperature distribution or a two-dimensional temperature gradient may be set up by dividing the planar heating elements into individual, separately controlled segments.

In this way predetermined temperature fields may be generated in the test object or a temperature distribution may be set up as it would arise in a large stack of cells.

Thus characteristics of a whole fuel cell stack may be measured on a single cell. To this end the temperature distribution arising in operation of the stack (the so-called intrinsic temperature distribution) must be found and simulated from outside.

According to the invention the temperature $T_Z$ in the fuel cell and the temperature $T_H$ in the heating element or in the individual segments of the heating element could for instance be measured and the temperature $T_H$ of the heating element could be regulated in such a way that the heating power of an adjacent cell is simulated.

To this end the temperature $T_H$ in the segment of the heating element is varied, while the other realistic operating conditions (known gas entry temperatures, constant anode and cathode stoichiometries, constant electric current) are kept constant. There results a temperature curve $T_Z$ from which the intrinsic temperature $T_i$ can be inferred (see the detailed description of FIG. 8).

If extreme temperature gradients are to be generated, the temperature $T_Z$ of the fuel cell may additionally be set or varied by applying or removing external insulating elements or active cooling elements.

The invention also provides for simulation of an accelerated aging process of the fuel cell through cyclical impression of extreme temporal and/or areal temperature gradients. This will permit the quick detection of weak points in new developments requiring only short test runs.

Furthermore service life or useful life in normal operation of the fuel cell may be inferred in this way.

Finally certain electrochemical parameters of the fuel cell, which have been obtained from simulation models or model computations, may be compared with measured values of these parameters and the simulation models may be adapted accordingly. The fuel cell may for instance be operated in a completely isothermal manner permitting the measured parameters (e.g. reaction kinetic quantities) to be assigned to a certain temperature.

A device for implementation of the method according to the invention is characterised above all by the fact that planar heating elements are placed parallel to the fuel cell plane at one or preferably both exterior faces of the single cell or the short stack, which heating elements are connected to a control and evaluation unit for the setting of a predetermined temperature.

The second aim of the invention is achieved by feeding the hot process gases into at least one heat exchanger, in order to lower the temperature of the process gas before it enters the exhaust vent of the testing station, and by carrying off the waste heat of the heat exchanger unit with the ambient air flowing into the exhaust vent.

A device implementing this method of the invention is characterised by the fact that at least one heat exchanger is positioned in the flow of the hot process gas, which lowers the entry temperature of the process gas before it enters the exhaust vent, and that a device is provided for cooling the heat exchanger by means of the ambient air flowing into the exhaust vent.

A cooling unit may be incorporated in an exhaust hood, for instance, which is immediately above or on the fuel cell testing station, and this cooling unit may be connected with the heat exchanger of the process gases and/or an electronic load and/or a heat exchanger for cooling a fuel cell component with circulating coolant (=primary cooling circuit). The cooling unit in the hood is in turn cooled by the air stream of the exhaust blower (=secondary cooling circuit). The flow volume of the blower must of course be substantially larger than the flow volume of the process gases to be cooled.

The third object of the invention is achieved by placing a thermally insulating element between the end regions of the fuel cell stack and the respective clamping element, which insulating element transmits the clamping force. In particular, the side walls of the fuel cell stack are also provided with an exterior insulation which is detached from the clamping elements.

The problems initially cited are thus solved by placing the clamping elements outside a thermal insulation, i.e. clamping is done in a low-temperature environment. Therefore light and inexpensive materials may be used, which need not be heated up during start-up of the fuel cell.

The invention provides that the two insulating elements at the stack ends are laterally embraced by the exterior insulation of the stack, whereby an essentially closed, thermally insulated space is formed, in which further components may be housed besides the fuel cells, such as high temperature heat exchangers, reformers and/or burners. This will—as in the fuel cell itself—reduce the mass of hot components, which have to supply mechanical strength for compensation of operational pressure or for sealing forces. Such sealing forces may be required for instance at the interfaces of the individual components where process gases are passed.

Pipes containing hot gases are not in mechanical contact with the clamping mechanism, since at least one of the thermally insulating elements at the stack ends is provided with openings for the passage of inlet and outlet pipes for the process gases involved in the operation of the fuel cells.

In an advantageous further development of the invention the clamping elements are held together by tensioning screws, with at least one clamping element being loaded by spring elements, which are placed outside of the insulation of the fuel cell stack. Thermal expansion of the stack may thus be compensated in the low-temperature environment by less costly means (e.g. simple helical springs).

An additional advantage lies in the fact that the clamping mechanism embraces the whole assembly and forms a mechanical frame, which acts as a housing and may serve multi-functionally, for instance as a mounting base for electrical or sensor interfaces.

According to the invention the thermally insulating elements and, if required, the exterior insulation may be made of porous ceramic material, for instance bound pyrogenic silicic acid (essentially $SiO_2$, $TiO_2$ and $Al_2O_3$), or consist of a pressure-resistant, metallic grid or frame structure with low heat conductivity (possibly combined with vacuum insulation).

The invention will not be explained in more detail with reference to the enclosed drawings.

DETAILED DESCRIPTION OF THE PREFERRED EMBODIMENTS

Figure 1:
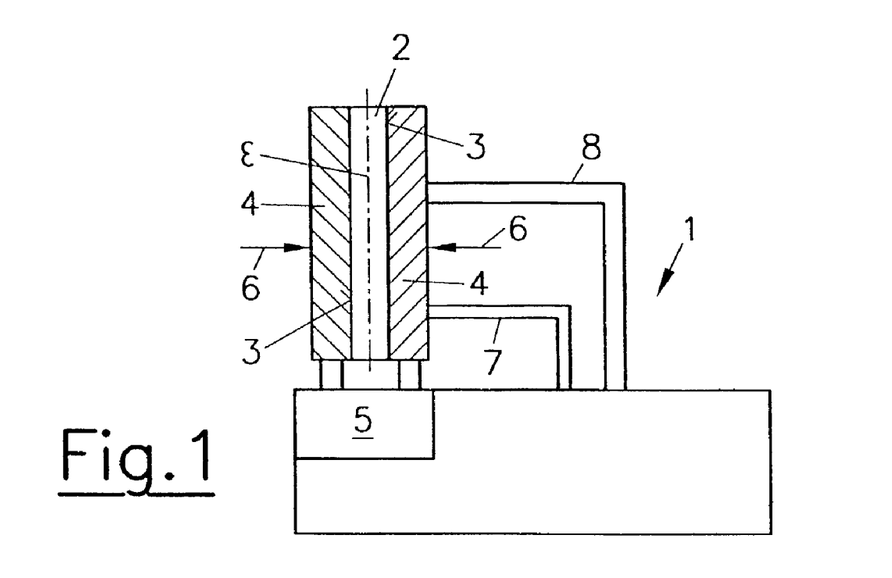
FIG. 1 is a sectional view of a measuring device for a single cell of a SOFC according to the invention.

FIG. 1 shows a measuring device 1 for single cells 2 of medium or high temperature fuel cells, preferably solid oxide fuel cells (SOFC) or molten carbonate fuel cells (MCFC). To simulate a given temperature curve planar heating elements 4 are placed parallel to the fuel cell plane $\epsilon$ at one, or preferably at both, exterior surfaces 3 of the single cell 2, which heating elements are connected to a control and evaluation unit 5 in order to set and regulate a given temperature.

A clamping mechanism 6, which is only schematically indicated in FIG. 1, is provided to press the heating elements 4 against the exterior surfaces 3 of the single cell 2. Inlet and outlet pipes for the process gases are indicated by 7 and 8.

Figure 2:
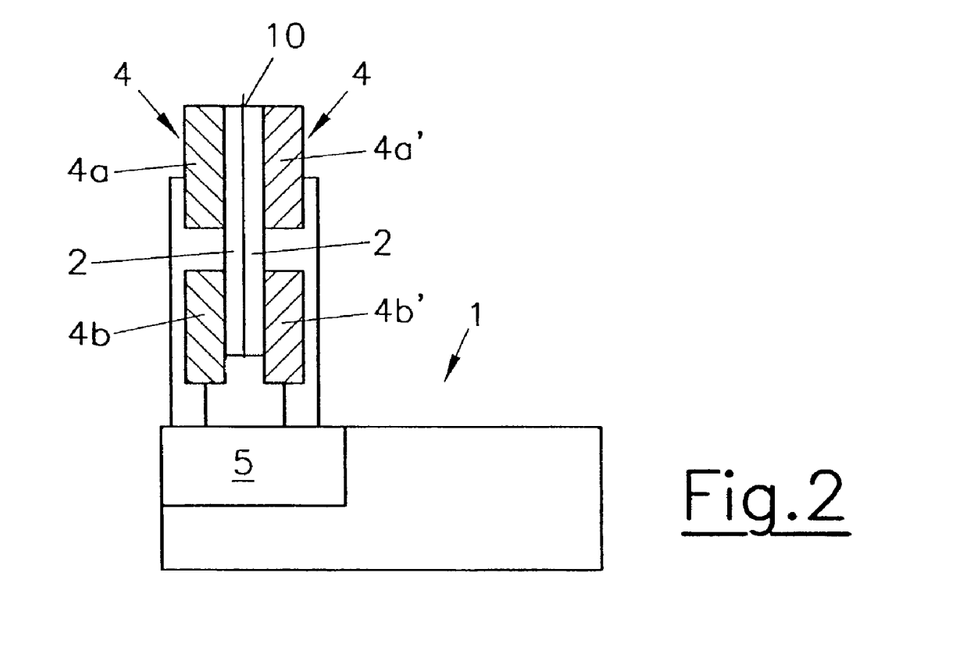
FIG. 2 is a sectional view of a variant of the measuring device as in FIG. 1.

As shown in the variant of FIG. 2 each of the heating elements 4 may be subdivided into a number of separately controlled segments $4a$, $4b$ resp. $4a'$, $4b'$, in order to be able to generate an areal or local temperature gradient. The drawing shows a short stack 10 consisting of two single cells 2.

Figure 3:
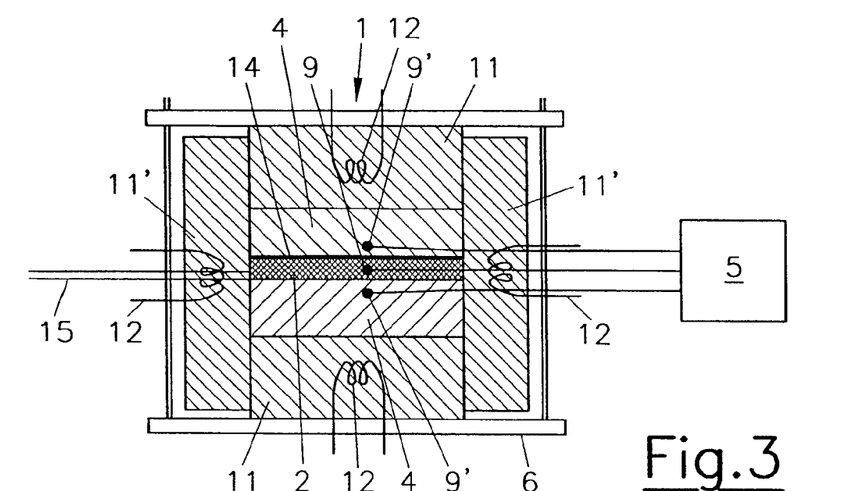
FIG. 3 shows another variant of the measuring device according to the invention in sectional view.
Figure 4:
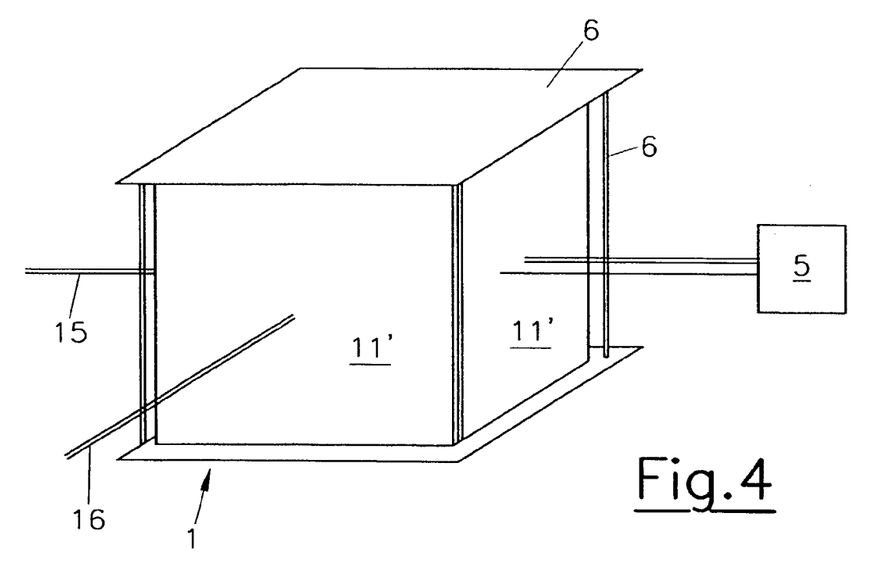
FIG. 4 is an oblique view of the measuring device of FIG. 3.

In the variant shown in FIGS. 3 and 4 temperature sensors 9, 9' are positioned essentially one above the other in the single cell 2 and in the heating elements 4, which are connected to a control circuit in the control and evaluation unit 5. The heating elements 4 are further provided with exterior, thermally insulating elements 11 on top and bottom and with insulating elements 11' on the side faces, which are separately detachable, thus permitting generation of different temperature gradients. Between the heating element 4 and the surface of the single cell 2 transfer elements (not shown here) may be inserted, which distribute the clamping pressure or direct the heat flow towards specific partial areas of the single cell 2. In order to be able to measure the heat flow into or from the fuel cell more accurately a thin thermally insulating intermediary layer 14 may be inserted between the heating element 4 and the fuel cell. This will, for a given heat flow, result in larger and thus more easily measurable temperature differences at the measuring sites of the temperature sensors 9, 9'. Instead of or in addition to the temperature sensors 9, 9' heat flow sensors may be deployed. Diverse electrical leads for the fuel cell current and the heating elements are indicated by 15 and 16.

Figure 5:
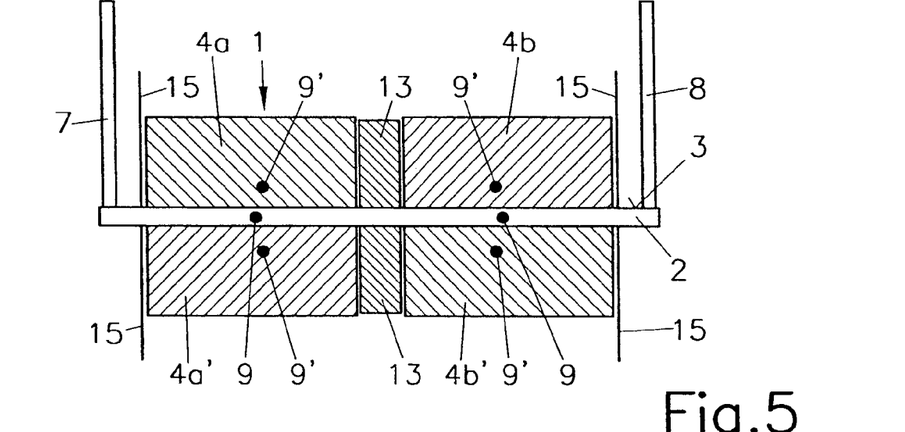
FIG. 5 shows another variant of the measuring device according to the invention in sectional view.
Figure 6:
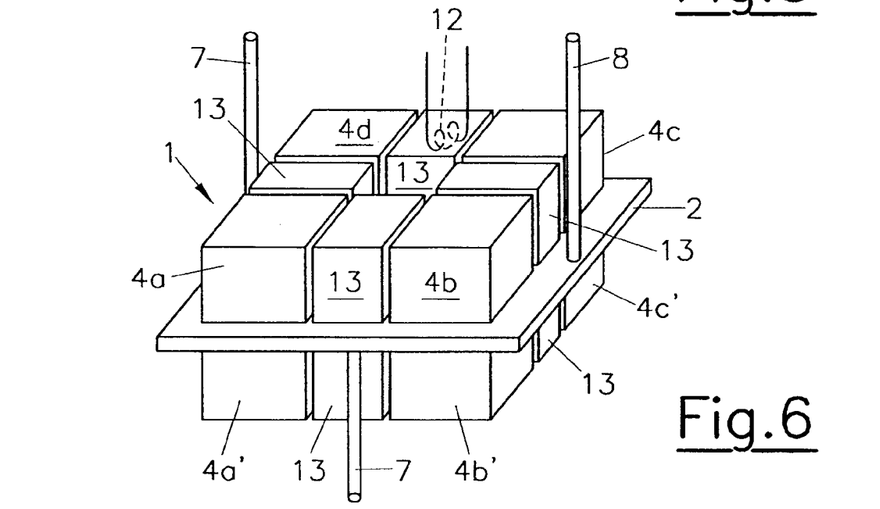
FIG. 6 is an oblique view of the measuring device of FIG. 5.

In the variant of the measuring device 1 shown in FIG. 5 and FIG. 6 each of the heating elements 4 is subdivided into a number of separately controlled segments $4a$, $4b$, $4c$, $4d$, and $4a'$, $4b'$, $4c'$, $4d'$, respectively. The exterior insulation 11 and 11' is not shown in the drawings for clearer view but can also be segmented correspondingly. A thermally insulating element 13 may also be placed between each of the heating element segments $4a$, $4b$, $4c$, $4d$, and $4a'$, $4b'$, $4c'$, $4d'$ adjacent to an exterior face 3 of the single cell 2. The individual segments are thereby thermally insulated against each other and exert no mutual influence.

It is furthermore possible to incorporate active cooling elements 12, e.g. heat exchangers for a cooling medium, in the exterior insulating elements 11, 11' (see FIG. 3) and/or in the insulating elements 13 (see FIG. 15), which are positioned between the heating element segments $4a$ to $4d'$. Heat transfer to the outside may thus be modified for each segment $4a$ to $4d'$ either by changing the thermal insulation 11, 11' and/or by active cooling from outside.

The gas connections (not shown in detail), the electrical contacts and temperature measurement of the single cells 2 may be realised by pressing the respective elements against the boundary layers of the single cell, i.e. the so-called inter-connectors. (The inter-connectors are gas-tight, electrically conductive layers separating the cathode gases from the anode gases of the next cell in the cell stack.) By applying an external mechanical force (clamping mechanism of FIG. 3 or FIG. 4) seals may be compressed, which seal the gas connections. The external force may also be used to realise electrical contacts for current output or for the measurement of the cell voltage. Temperature sensors may also be pressed against the cell in this way.

Figure 7:
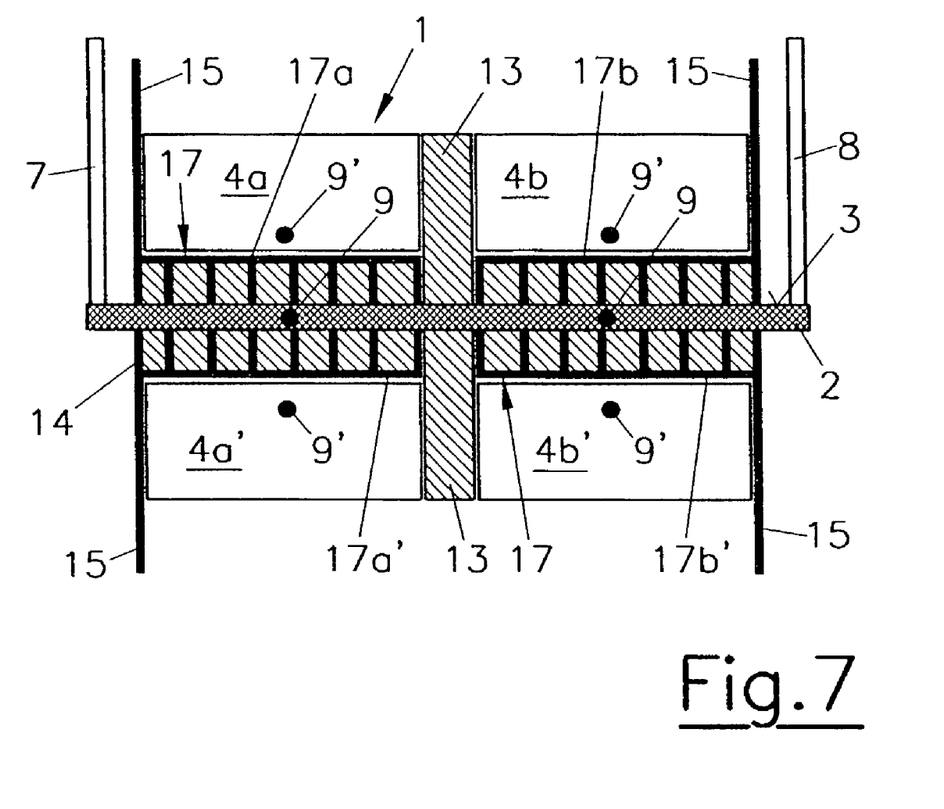
FIG. 7 shows another variant of the measuring device according to the invention in sectional view.

Current and voltage of the fuel cell, as well as temperature, can be measured or derived from sites of the inter-connectors which are distributed over their area. In the case of very thin inter-connectors (thickness<1 mm) or of inter-connectors with low electric conductivity it is usually necessary to output the current from multiple sites distributed over the fuel cell surface. Otherwise large ohmic losses would occur in the passage of the thin inter-connectors, which would invalidate the measurement results. In the case of inter-connectors with low conductivity a current collector 17 with a really distributed contact sites is placed in the insulating intermediate layer 14 of the assembly as described above (see FIG. 5). A variant of this type is shown in FIG. 7.

The current collectors 17 may be partitioned into a number of separately contacted segments 17a, 17b, 17a', 17b' and thus be segmented correspondingly to the heating elements 4a to 4b', for instance.

In this way a current and voltage measurement resolved into segments will be possible. Furthermore it will be possible to impress currents on individual segments, and related electrical diagnostic methods such as impedance spectroscopy may be applied.

Figure 8:
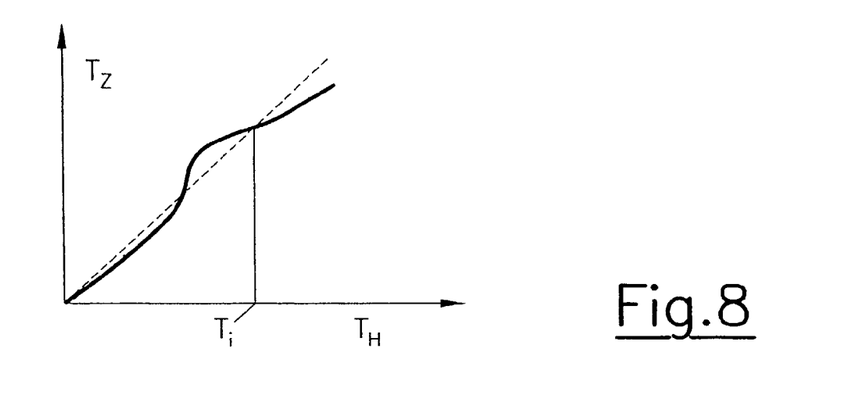
FIG. 8 is a diagram of the temperature curve resulting from realistic material values.

The temperature $T_H$ in the heating element segment is varied as shown in FIG. 8. The curve shows the temperature $T_Z$ in the single cell. The intrinsic temperature $T_i$ can be determined as that temperature $T_H$ at which $T_Z$ changes with increasing $T_H$ from $T_Z>T_H$ to $T_Z<T_H$.

After $T_i$ has been determined an additional compensation of heat conduction in the inter-connectors or, if present, in the current collectors 17 as shown in FIG. 7 will be necessary. The single cell 2 is bounded by two inter-connectors. In a real fuel cell stack only two halved inter-connectors ought to be assigned to each cell since the inter-connectors will also be used by the adjacent cells. Therefore the heat conduction of one of these inter-connectors must be compensated. If current collectors are present they will also contribute to planar heat conduction. Their influence on $T_i$ must be determined by computation. The compensation calculation will take into account the measured $T_i$ in the segments and heat conduction through the additional components as described. The compensation calculation will produce $T_i$ (computed) as a result, which would occur in the real cell stack.

In order to operate the cell under the real intrinsic temperature distribution the temperatures resulting from the compensation calculation must be impressed on the cell by means of the heating elements.

Besides the direct transposition of the single cell measurement results to the situation in the fuel cell stack there arise the following valuable possibilities for studying single cells and short cell stacks:

Simulation models for SOFC fuel cells may be comprehensively validated, by impressing for instance various temperature distributions and comparing the resulting electrochemical characteristics with the simulation results.

Transient phenomena and in particular start-up may be realistically simulated.

The minimum attainable start-up time under essentially gradient-free heating may be studied.

By cyclical impression of extreme gradients accelerated aging tests may be defined and performed.

Figure 9:
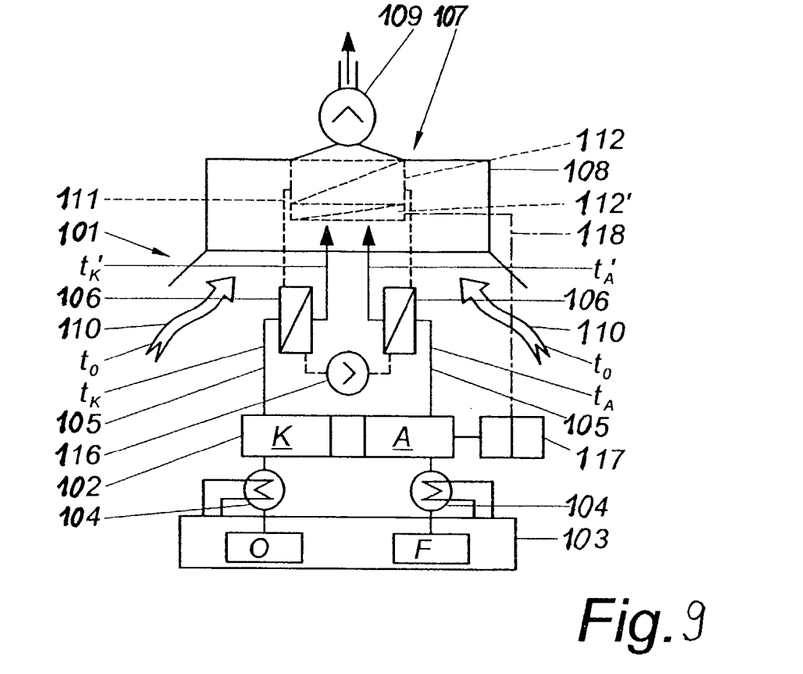
FIG. 9 shows a variant of the device of the invention for cooling hot process gases arising in the operation of fuel cells.

FIG. 9 shows in a first embodiment of the invention a fuel cell testing station 101 with a device according to the invention for cooling of the hot process gases, which occur in the operation of a fuel cell or a fuel cell stack 102. The primary process gases for the operation of the fuel cell are supplied by a mixing and conditioning unit 103, in which the values of pressure, temperature and composition of the gas may be chosen, and where separate electric heating elements 104 for the fuel F and the oxydating agent O, for instance air, are provided. On the anode side A as well as on the cathode side K of the fuel cell 102 heat exchangers 106 are placed in the flow of hot process gases 105, which efficiently lower the temperature $t_K'$ and $t_A'$ with which the process gases enter the exhaust vent 107 of the testing station as compared to the exit temperatures $t_K$ and $t_A$ from the fuel cell. The exhaust vent 107 has an exhaust hood or chimney 108 and a fan or a suction device 109 by which the process gases are diluted and carried off with the help of a surplus inflow of ambient or laboratory air 110. The fan or suction device 109 may be the usual laboratory venting system, it may serve more than one testing station and it may be situated at a distance from the individual exhaust hoods.

It is furthermore of advantage if the waste gases from the exhaust vent are fed into a heat recovery unit (not shown). The recovered waste heat may be used to warm fresh air entering the laboratory or to preheat the process gases at the testing station.

In the variant shown in FIG. 9 the heat exchangers 106 are configured as coolant/gas heat exchangers and are connected via a coolant loop 111 to a cooling unit 112 located in the exhaust hood 108. The coolant circling in the coolant loop 111, for instance water, carries the waste heat of the heat exchangers 106 to the cooling unit 112, which is cooled by ambient air 110 entering at temperature to. Due to this arrangement the process gas flows enter the exhaust vent in a cooled and diluted state, and can be discharged without danger of explosion. An electrical load 117 connected to the fuel cell or another fuel cell component which has to be cooled may be connected via a cooling loop 118 (indicated by a dot-dash line) to the cooling unit 112 for the heat exchangers 106 or to a separate cooling unit 112' in the exhaust vent 107.

Figure 10:
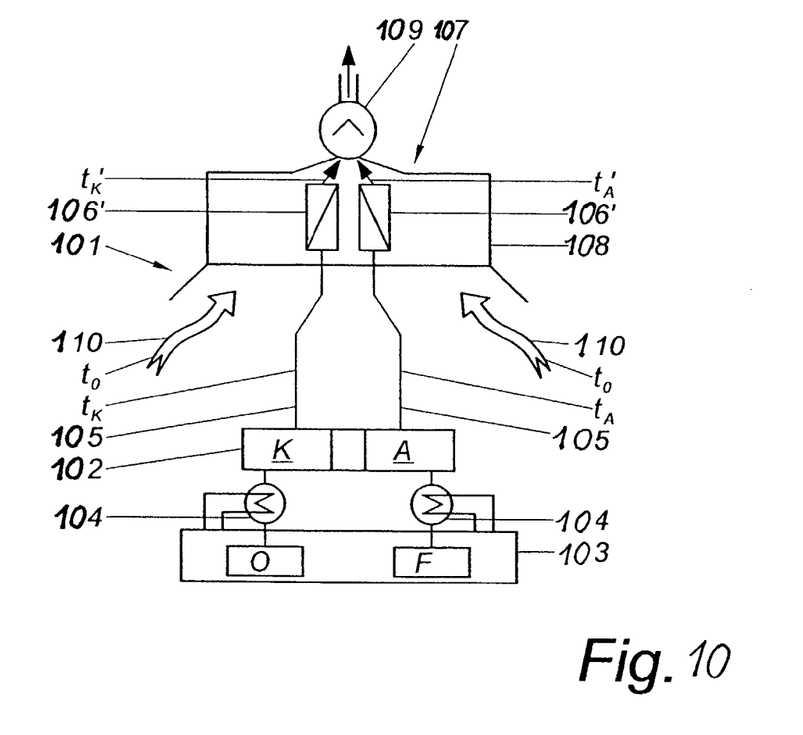
FIG. 10 shows a subvariant of the embodiment of FIG. 9.

In the variant shown in FIG. 10 the two heat exchangers 106' are configured as air/gas heat exchangers, which are placed in the exhaust hood 108 of the exhaust vent 107 to save space, and which are directly cooled by the ambient air 110 flowing into the exhaust unit.

Figure 11:
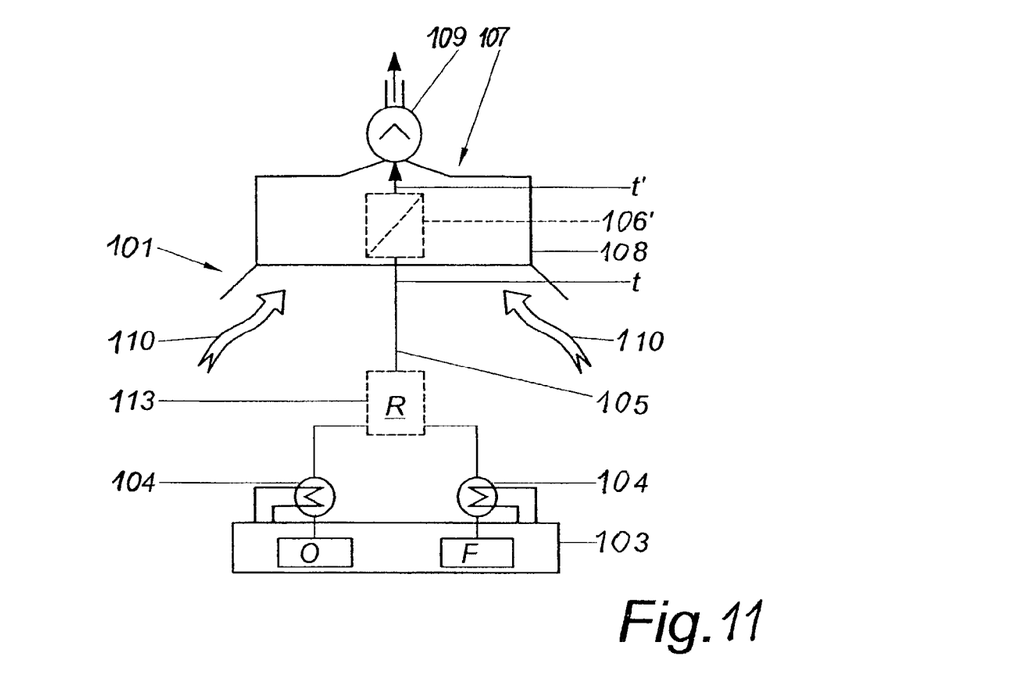
FIG. 11 and FIG. 12 show variants of the device for cooling hot process gases which arise in the testing of a reformer or in the testing of a mixing and conditioning system for fuel cells.

The variant of FIG. 11 shows a reformer 113 being tested in operation, with a mixing and conditioning unit 103 supplying the required quantities of fuel F and air O under conditions to be chosen. The hot reformed product exiting from the reformer 113 at temperature t is cooled to temperature t' in the air/gas heat exchanger 106' in the exhaust hood 108 and may be discharged through the exhaust vent 107 without danger.

Figure 12:
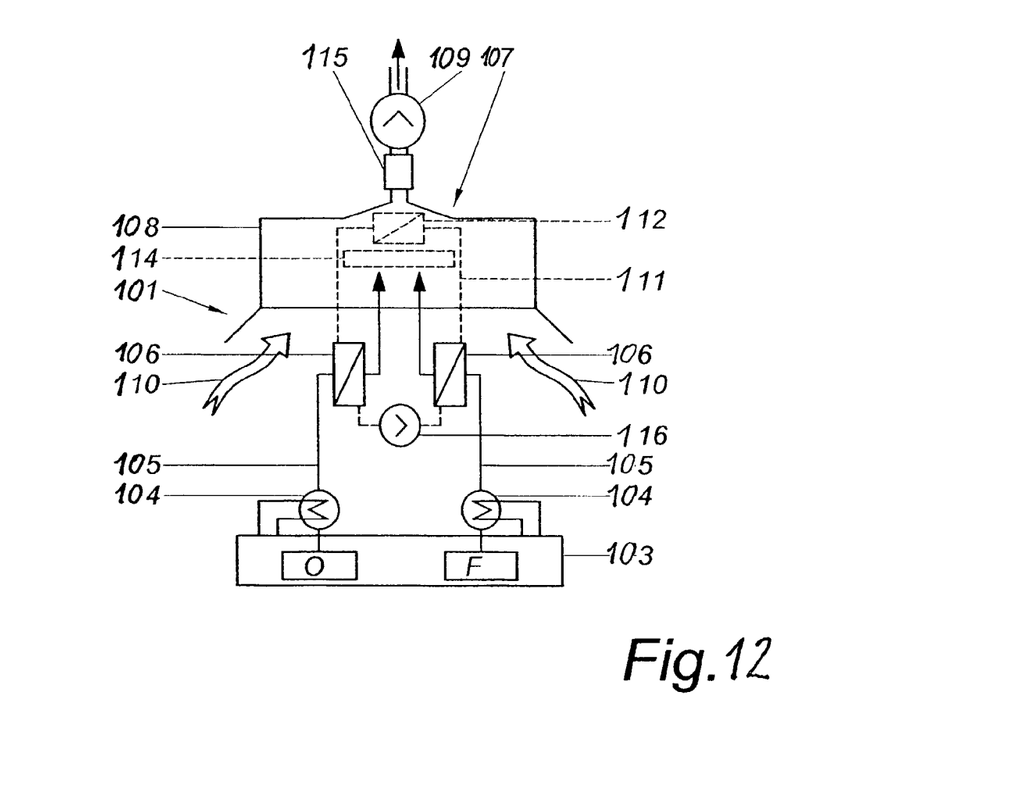

Finally the mixing and conditioning unit 103 itself may be tested—as shown in FIG. 12. The two suitably conditioned primary process gas streams (air and fuel) are fed into heat exchangers 106, which are connected to a cooling unit 112 via a coolant loop 111, as in the variant of FIG. 9. The coolant is circulated by a pump 116.

In all of the above variants a catalytic converter may be placed in the exhaust vent 107, in flow direction either before or after the cooling unit 112 or the heat exchanger 106'. It will also be of advantage to place a condensate- or water-separator 115 at the exit side of the exhaust vent 107.

Figure 13:
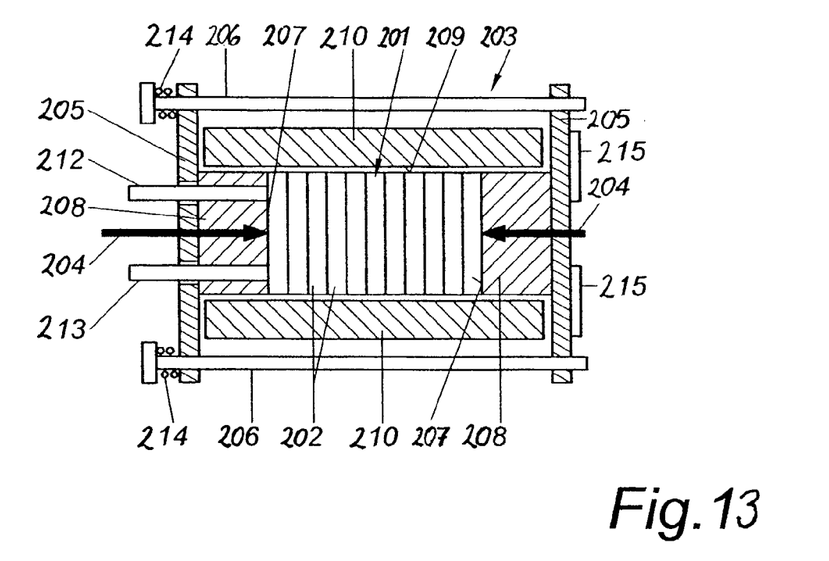
FIG. 13 shows a fuel cell stack according to the invention in a longitudinal section.

The fuel cell stack 201 shown in FIG. 13 consists of medium- or high-temperature fuel cells 202, for instance solid oxide fuel cells (SOFC) or molten carbonate fuel cells (MCFC), which are pressed against each other by a clamping mechanism 203 in order to compensate the internal operating pressure, seal the individual fuel cells 202 and assure good electrical contact between the intermediary plates or bipolar plates and the electrodes. Thus a clamping force indicated by arrows 204 is exerted upon the fuel cell stack 201. The clamping mechanism 203 consists of two clamping elements 205, which are held together by tensioning screws 206.

The whole clamping mechanism 203 is external to the thermal insulation of the fuel cell stack 201, with an essentially pressure-resistant, thermally insulating element 208 being placed between the ends 207 of the stack 201 and the respective clamping element 205, which insulating element undergoes plastic and elastic deformations of between 5% and 10% at the pressure and temperature values occurring. The clamping force exerted by the clamping mechanism 203 (arrows 204 normal to the fuel cell plane) is thus transmitted by the insulating elements 208 to the fuel cell stack 201; thus the clamping mechanism, which is in the low temperature region, may be made from inexpensive, light materials such as aluminium or aluminium alloys. The sides 209 of the fuel cell stack 201 are furnished with an exterior insulation 210, which is not subject to pressure forces of the clamping mechanism 203 (observe the gap between the exterior insulation 210 and the clamping elements 205) and which together with insulating elements 208 at the stack ends forms an essentially closed space. The exterior insulation 210 therefore requires material that is resistant to high temperature, but does not have to be pressure-resistant. The exterior insulation 210 is made up of a number of parts (for instance two half-shells for a cylindrical fuel cell stack) and can be detached without removing the clamping mechanism 203.

As is schematically shown in FIG. 13, at least one of the thermally insulating elements 208 at the stack ends has openings 211 for the passage of inlet and outlet pipes 212, 213 carrying the process gases necessary for operating the fuel cells 202.

Thermal expansion of the fuel cells 202 and eventual deformation of the insulating elements 208 at start-up is compensated by providing that at least one clamping element 205 is spring-loaded, for instance by helical springs 214, which are placed outside of the insulation 208, 210 of the fuel cell stack 201.

The clamping mechanism 203 embraces the whole assembly and forms a mechanical frame, which functions as a housing and may serve as a mounting platform for electrical connectors 215 or as a sensor interface.

Figure 14:
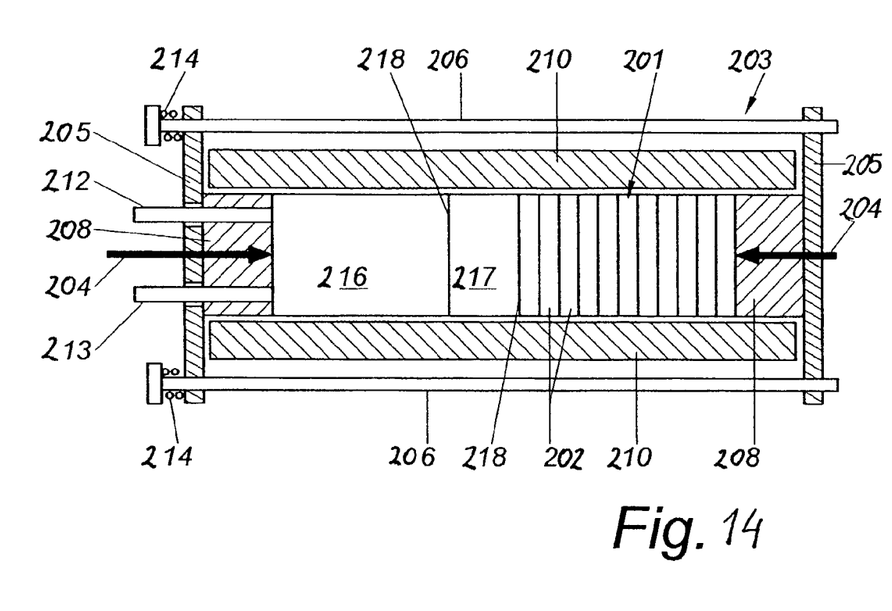
FIG. 14 shows a variant of the fuel cell stack in a sectional view as in FIG. 13.

FIG. 14 shows a variant in which in a space contained within the clamping mechanism 203 and bounded by the end insulation elements 208 and the exterior insulation 210, there are placed other fuel cell components besides the fuel cells 202 themselves, such as a high-temperature heat exchanger 216 and a reformer and/or burner 217, whose interfaces 218 through which the process gases are passed, are also pressed together by the clamping mechanism 203.

The invention claimed is:

1. A fuel cell stack which comprises:
    a plurality of medium or high-temperature fuel cells aligned in a row and defining opposite ends,
    first and second clamping elements respectively positioned near opposite ends of said row of fuel cells,
    first and second thermally insulating end elements respectively positioned between said first and second clamping elements and respective opposite ends of the row of fuel cells, said first and second thermally insulating end elements being essentially pressure resistant elements being capable of applying clamping force to the row of the fuel cells via said first and second thermally insulating end elements, and
    exterior insulation elements separate from the first and second thermally insulating end elements positioned around sides of said row of fuel cells, said exterior insulation elements embracing outer lateral sides of said first and second thermally insulating end elements but not contacting said first and second clamping elements.

2. The fuel cell stack according to claim 1, wherein further fuel cell components, such as high-temperature heat exchangers, reformers and/or burners, are contained in a space formed by the exterior insulation and the first and second thermally insulating end elements.

3. The fuel cell stack according to claim 1, wherein at least one of the first and second thermally insulating end elements includes openings for the passage of inlet and outlet pipes for the process gases involved in the operation of the fuel cells.

4. The fuel cell stack according to claim 1, including tensioning screws for holding the first and second clamping elements under tension against each other with at least one clamping element being spring-loaded by spring elements located on a side of said at least one clamping element opposite the row of fuel cells.

5. The fuel cell stack according to claim 4, wherein the first and second clamping elements and the tensioning screws form a mechanical frame which functions as a housing and includes electrical connectors.

6. The fuel cell stack according to claim 1, wherein the first and second thermally insulating end elements are made of porous ceramic material.

7. The fuel cell stack according to claim 1, wherein the first and second thermally insulating end elements consist of a metallic grid or supporting structure.

8. The fuel cell stack according to claim 1, wherein the cells comprise solid oxide fuel cells or molten carbonate fuel cells.

9. The fuel cell stack according to claim 6, wherein the porous ceramic material consists of bound pyrogenic silicic acid.

* * * * *